No. 844,249. PATENTED FEB. 12, 1907.
C. B. CLARK.
ATTACHMENT FOR CULTIVATORS.
APPLICATION FILED AUG. 3, 1906.
2 SHEETS—SHEET 1.
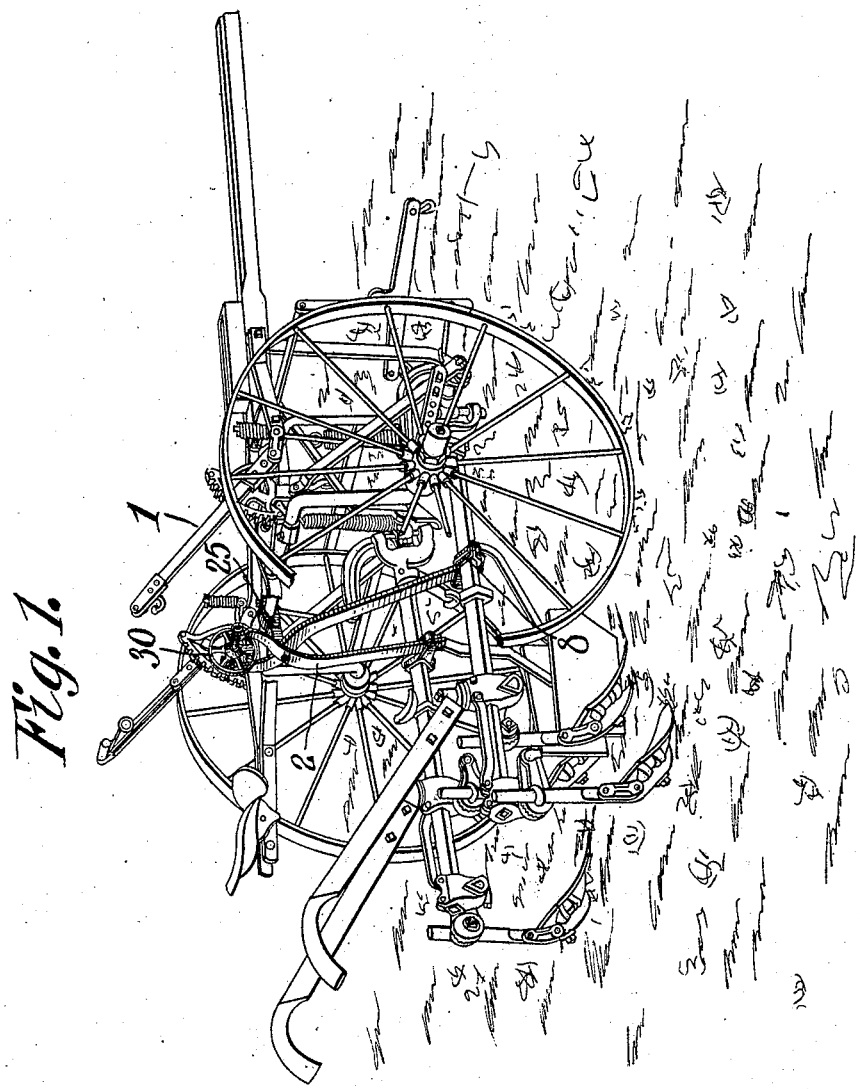
Witnesses
C. E. Smith.
A. S. Kitchin.
Inventor
Cyril B. Clark,
By Mason, Fenwick & Lawrence
his Attorneys

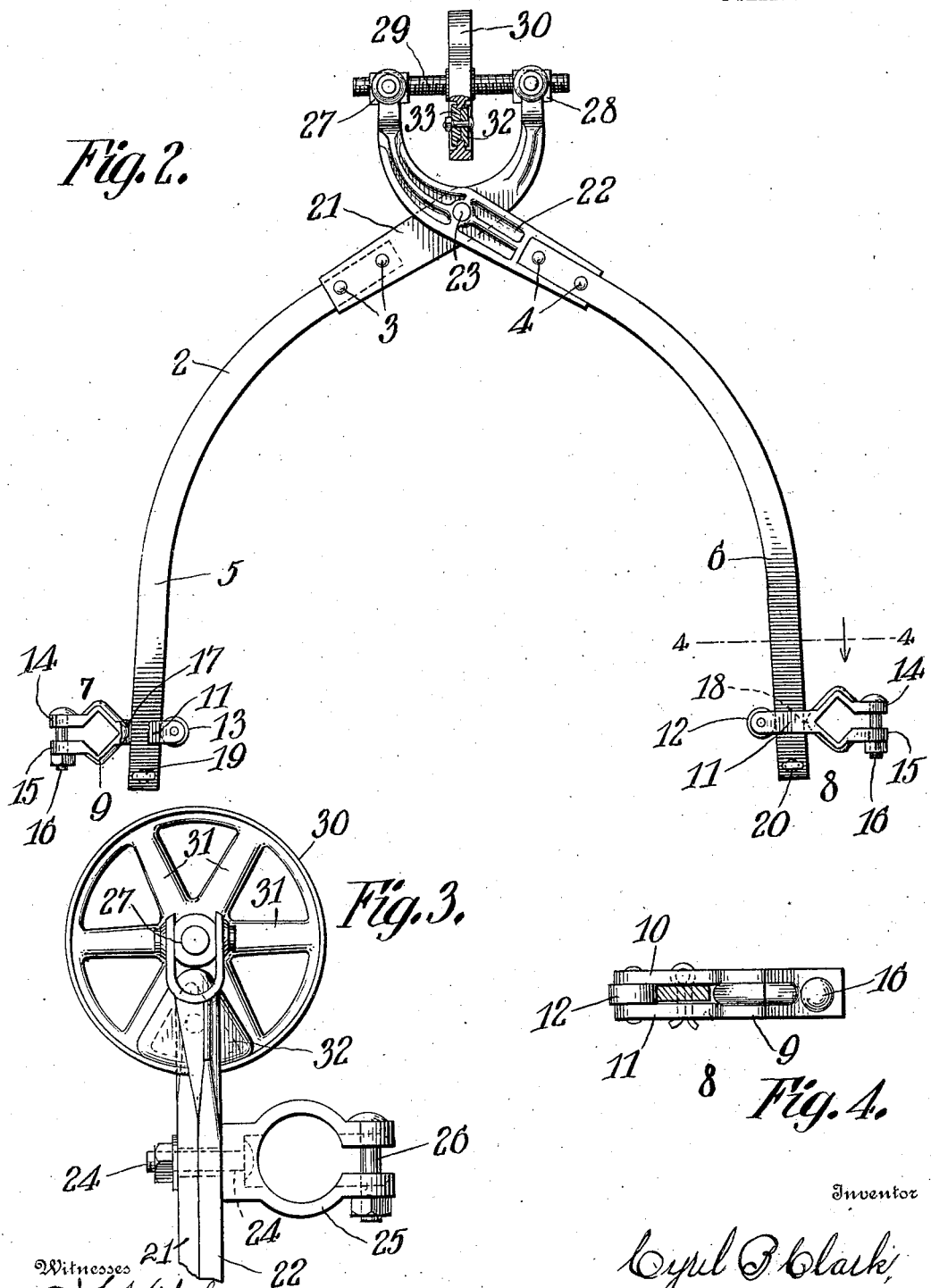

UNITED STATES PATENT OFFICE.

CYRIL B. CLARK, OF LOUISVILLE, KENTUCKY, ASSIGNOR TO B. F. AVERY & SONS, A CORPORATION OF KENTUCKY.

ATTACHMENT FOR CULTIVATORS.

No. 844,249.         Specification of Letters Patent.         Patented Feb. 12, 1907.

Application filed August 3, 1906. Serial No. 329,124.

*To all whom it may concern:*

Be it known that I, CYRIL B. CLARK, a citizen of the United States, residing at Louisville, in the county of Jefferson and State of Kentucky, have invented certain new and useful Improvements in Attachments for Cultivators; and I do hereby declare the following to be a full, clear, and exact description of the invention, such as will enable others skilled in the art to which it appertains to make and use the same.

This invention relates to improvements in attachments for cultivators, and is particularly directed to means for adjusting and regulating the distance apart of plow-beams of cultivators.

The invention comprises the production of a pair of cross-bars pivotally secured together at the point of crossing, means for securing the lower end of said bars to the beams of a cultivator, and means secured to the upper end of said bars for regulating the distance between the lower ends of said bars.

The invention further comprises the production of cross-bars, means adjustably secured to their lower ends for engaging the beams of a cultivator, a wheel and threaded shaft therefor positioned between the upper ends of said bars, and oscillating trunnions mounted upon the upper end of said bars for receiving said axle for adjusting the distance between the lower ends of the cross-bars.

The object in view is the provisions of means adapted to be operated by hand for regulating the distance between the plow-beams of a cultivator.

Another object in view is the production of a pair of cross-arms pivotally secured together near their upper ends and means adjustably secured to their lower ends for engaging the beams of a cultivator and mechanism secured to the upper ends of said cross-arms for regulating the distance between the beams of a cultivator and the lower ends of the cross-arms which are secured thereto.

Another object in view is the production of a pair of cross-arms pivotally secured together and rigidly secured at the pivotal point to a cultivator, means adjustably secured to the lower end of the cross-arms for engaging the plow-beams of a cultivator, and adjustable means secured to the upper ends of the cross-arms that is adapted to be operated by hand and to adjust the distance between the plow-beams of a cultivator without causing any of the weight of the plow-beams to rest upon the cross-arms.

With these and other objects in view the invention comprises certain other novel constructions, combinations, and arrangements of parts, as will be hereinafter fully described and claimed.

In the accompanying drawings, Figure 1 represents a perspective view of a riding-cultivator with a preferred embodiment of my invention secured thereto, certain parts of the cultivator being broken away to better disclose the invention. Fig. 2 is a side elevation of the preferred form of my invention. Fig. 3 is an enlarged detail edge view of the upper portion of Fig. 1. Fig. 4 is an enlarged detail view taken on line 4 4 of Fig. 2 looking in the direction indicated by the arrow.

In the use of riding-cultivators it has been customary to tie the beams of a plow together in various ways and to provide foot-rests for moving the beams of a plow as may be desired. The means employed for tying the plow-beams together is commonly known as a "hobble" or "dodge" and is used so as to permit both beams to be moved simultaneously for avoiding obstructions and the like. It has been found desirable in these classes of inventions to have a hobble or tying means that may be adjusted so as to vary the distance of tying means, and it is to this class of devices that the present invention relates.

Referring more particularly to the drawings, 1 indicates any suitable cultivator, preferably of the riding type. Secured to the cultivator 1 is a pair of cross-arms 2, which embodies the present invention. As will be clearly seen from Fig. 2, the cross-arms 2 are formed of a plurality of parts and are secured together by any suitable means, as bolts 3 and 4. The lower ends 5 and 6 of the cross-bars 2 are preferably made straight, so that when they are attached to the beams of a cultivator and the beams are in their normal position the portions 5 and 6 will be vertical. Positioned upon the portions 5 and 6 are beam-clasp members 7 and 8, respectively, which are adapted to reciprocate upward and downward on the straight portions 5 and 6. The members 7 and 8, respectively, are made with a gripping portion 9 and are formed with a bifurcation having arms 10 and 11, as will be clearly seen in Fig. 4. The portions 5 and 6 of the cross-bars 2 are adapted to pass between the arms 10 and 11 and to guide the members 7 and 8 in their movement. Pivotally secured to the outer end of the members 7 and 8 are antifriction-rollers 12 and 13. The gripping portion 9 is bifurcated, so as to form arms 14 and 15, through which passes any suitable securing means, as bolt 16, which is adapted to firmly hold the clamping means 9 in contact with the beams of a cultivator-plow, as will be clearly seen in Fig. 2. The respective members 7 and 8 are formed with a double-beveled portion 17 and 18, respectively, which is adapted to form a loose contact with the members 5 and 6. In this way the members 7 and 8 are allowed a slight pivotal movement, as well as a reciprocating movement.

In operation when the members 7 and 8 are secured to the beams of a cultivator and the same oscillate and move upward and downward slightly on account of the unevenness of the ground or for other causes the beams of the cultivator will be permitted free movement in a vertical plane, because of the adaptability of the members 7 and 8 to reciprocate upon the portions 5 and 6. It will be thus seen that the beams of a cultivator may move upward or downward, but cannot move laterally unless the members 5 and 6 are moved, which movement is caused or prevented by means secured to the upper portion of the cross-bars 2, which will be more clearly hereinafter described.

Secured to the extreme lower ends of the portions 5 and 6 are any suitable form of stops, as 19 and 20, for preventing the members 7 and 8 from being accidentally removed from the cross-arms 2. Secured to the members 5 and 6 are substantially L-shaped members 21 and 22, pivotally secured together by any suitable means, as bolt 24. The bolt 24 secures the members 21 and 22 together and at the same time secures them to a supporting-clasp 25, as will be clearly seen in Figs. 1 and 3. The clasp 25 is made of any suitable shape for gripping a cross-bar positioned on any desirable type of cultivator and is adapted to be tightly secured in place by any suitable tension means, as bolt 26. The upper ends of the members 21 and 22 are bifurcated and are adapted to accommodate oscillating trunnions 27 and 28. The trunnions 27 and 28 are internally threaded in opposite directions for accommodating a threaded bolt 29, which has the opposite ends threaded in opposite directions—that is, half of the shaft 29 is threaded with a right-hand thread and the other half with a left-hand thread, and the trunnions 27 and 28 are threaded to accommodate the various threads. Rigidly secured to the center of the shaft 29 is a hand-wheel 30, which is adapted to rotate the shaft 29 in either direction for regulating the distance between the trunnions 27 and 28, and consequently the distance between the members 7 and 8. The wheel 30 is preferably made with a number of spokes, as 31, as will be clearly seen in Fig. 3.

Secured between any two of the spokes 31 is a weight 32, which is preferably made in two parts and secured in place by a bolt 33. If desirable, the weight 32 may be made integral with the wheel 30. The weight 32 is adapted to normally hold the wheel 30 from accidental revolving by reason of the continual jars and strains of the device when in use, but will not interfere with the operation of the wheel 30 by hand.

By pivotally securing the cross-bars 2 together and rigidly securing the cross-bars to a cultivator at the point where the same is pivotally secured together produces a cultivator attachment or hobble that is sustained in position at all times ready to be operated upon by hand as occasion may require. The plow-beams being secured to clamps 7 and 8, which are loosely secured to the lower ends of the cross-bars 2, permits the plow-beams to move upward and downward without in the least interfering with the same. As the lower ends of the cross-bars 2 are brought together or spread apart it will simply effect the bars in like manner and not in any way either raise or lower the same, but will permit the beams and the plows attached thereto to operate in their usual manner.

Having thus fully described my invention, what I claim as new, and desire to secure by Letters Patent, is—

1. The combination with a cultivator, of a pair of cross-arms secured thereto, means for regulating the distance between the ends of said cross-arms, clamps mounted upon the lower ends of said arms for gripping the beams of said cultivator at any desired point, and means for adjusting the position of the clamp on the cultivator-beams, said clamps and said arms being adapted to move said beams laterally without interfering with the vertical reciprocatory movement of said beams.

2. A device of the character described, comprising a pair of cross-arms, movable means secured to the lower ends of said cross-arms for transmitting power to the beams of the cultivator, means secured to the upper ends of said arms for operating the same, a wheel for operating said means, a weight secured to said wheel for normally holding the same against operation, said weight being formed in a plurality of parts for easy removal and adjustment, and means passing through said weight for holding the same in position.

3. A device of the character described, comprising a pair of cross-arms, means for opening and closing said arms, reciprocating clamps positioned on the lower ends of said arms for engaging the beams of a cultivator, said clamps comprising a clamping portion, means for operating said clamping portion, a bifurcated portion for partially inclosing the lower ends of the said cross-arms, means for permitting pivotal movement of said clamp, and an antifriction-roller secured to the outer end of said bifurcated portion for holding said clamp in position, and for providing antifriction means for said clamp.

4. A device of the character described, comprising a pair of cross-arms, means for opening and closing said cross-arms, and a pivotally-mounted reciprocating clamp positioned on the lower ends of said cross-arms and carried thereby for gripping the beams of a cultivator, said clamp comprising a clamping portion, a bifurcated portion secured to said clamping portion, a double-beveled portion between said bifurcation for contacting with said cross-arms and for permitting pivotal movement of said clamp, and antifriction means secured between the outer ends of said bifurcated portion opposite said beveled portion for holding said clamp in position.

In testimony whereof I affix my signature in presence of two witnesses.

CYRIL B. CLARK.

Witnesses:
H. E. HARDIN,
C. W. BIRNSTIEL.